United States Patent [19]

Yoshida

[11] 3,872,436

[45] Mar. 18, 1975

[54] ELECTRICAL SIGNAL TRANSMITTING SYSTEM

[75] Inventor: Takaomi Yoshida, Nagoya, Japan

[73] Assignee: Kabushiki Kaisha Tokai Rika Seisakusho, Aichi Pref., Japan

[22] Filed: May 21, 1973

[21] Appl. No.: 362,635

[30] Foreign Application Priority Data

May 23, 1972 Japan .............................. 47-50399

[52] U.S. Cl. ........................ 340/147 PC, 340/171 R

[51] Int. Cl. ........................ H04q 1/45, H04q 1/18

[58] Field of Search .......... 340/147 PC, 171 R, 172, 340/310

[56] References Cited

UNITED STATES PATENTS 2,154,886 4/1939 Bachelet ...................... 340/147 PC

*Primary Examiner*—Harold I. Pitts

*Attorney, Agent, or Firm*—Woodhams, Blanchard and Flynn

[57] ABSTRACT

A system for transmitting electrical signals through a single signal line. This system includes a transmitter and a receiver and the transmitter contains a change-over switch connected to resistors having different values and another change-over switch connected to condensers also have different values, while the receiver contains a D.C. signal discriminating circuit, condenser-grounded type oscillating circuits and oscillation detecting circuits. The change-over position signal of the former switch is carried as a D.C. signal on a single signal line and detected by the D.C. signal discriminating circuit, while that of the latter switch is carried on the same signal line as an A.C. signal and detected by the oscillating circuits and the oscillation detecting circuits. Therefore, D.C. and A.C. signals indicating the positions of the two switches can be simultaneously transmitted on a single signal line and can be discriminated at the receiver reliably without the fear of misoperation and confusion.

10 Claims, 5 Drawing Figures

ELECTRICAL SIGNAL TRANSMITTING SYSTEM

FIELD OF THE INVENTION

This invention relates to an electrical signal transmitting system for remote control, remote monitoring, etc.

DESCRIPTION OF THE PRIOR ART

Conventional methods for transmitting a plurality of signals on a single line include the PCM system and the frequency division system. These systems requires such a large amount of equipment that they are too expensive and unsuitable to be used to transmit a small number of simple electrical signals to relatively near places.

A possible way to transmit simple electrical signals may be the voltage division system which uses resistor division, such as shown in FIG. 1, where 1 is a transmitter, 2 is a receiver, 3 is a change-over switch having a plurality of contacts, 4 is a signal line, R0, R1, R2 . . . are resistors having different values, and 5 is a D.C. voltage signal discriminating circuit.

When the movable contact of the change-over switch 3 is made connected with the first fixed contact, the voltage on the signal line 4 takes the resistor-divided value Vcc·R1/R0+R1 of the supply voltage Vcc. By identifying this value in the D.C. voltage discriminating circuit 5, it can be recognized that the movable contact is on the first fixed contact. Every time the movable contact of the switch 3 is changed over to a different fixed contact, a different voltage appears on the signal line 4 due to the different resistors connected to the respective fixed contacts and this therefore makes it possible to identify the position of the movable contact.

In such a method, however, a finer division of the supply voltage is required to increase the quantity of signals to be transmitted and so the discrimination by the D.C. voltage discriminator 5 becomes very difficult.

Although only a single change-over switch 3 is used in the above example of the prior art, FIG. 2 shows a system in which two independent change-over switches are used whose respective change-over positions are transmitted on a single line by applying the above mentioned voltage-division system. When the movable contact 3' of the change-over switch 3 is switched to its first fixed contact, the D.C. voltage on the signal line 4 assumes the value of $$\mathrm{Vcc}\cdot\frac{\frac{R1\,R1'}{R1+R1'}}{R0+\frac{R1\,R1'}{R1+R1'}},$$

which results from the resistor-division (i.e., voltage division) by the parallel resistance R1R1'/R1+R1' composed of resistors R1 and R1', and the resistor R0. This value may be identified by the D.C. voltage discriminating circuit 5 to find the positions of the change-over switches 3, 3'.

However, if the change-over switch 3 has n fixed contacts and the change-over switch 3' has m fixed contacts, it will be necessary to divide the supply voltage into $n \times m$ parts in order that all the combinations of the positions of these switches should be converted to many D.C. voltages and discriminated by the D.C. voltage discriminating circuit 5. It would be very difficult to discriminate such finely divided voltage values by the D.C. voltage discriminating circuit 5.

SUMMARY OF THE INVENTION

The present invention is directed to overcoming the above-mentioned difficulties. The invention has for its object to provide an electrical signal transmitting system which is capable of recognizing the position of the movable contact of each of two change-over switches having many contacts by using only a single line.

According to the present invention, there is provided an electrical signal transmitting method comprising short-circuiting or opening of the connection between a signal line on a transmitter side and a ground by means of dividing resistors to obtain D.C. voltage signals; and short-circuiting or opening of the connection between the signal line on the transmitter side and the ground by means of grounded condensers constituting a part of condenser-grounded type oscillating circuits in a receiver side whereby the oscillating circuits in the receiver corresponding to said condensers start or stop oscillation to obtain A.C. signals; thereby to send such D.C. and A.C. signals on single signal line.

BRIEF DESCRIPTION OF THE DRAWINGS

The invention will be described for an embodiment with reference to the drawings, in which FIGS. 3 – 5 show circuit diagram of an electrical signal transmitting system according to the present invention wherein FIG. 3 is its block diagram, FIG. 4 is the diagram of the oscillating circuit employed in the present invention and FIG. 5 is a detailed circuit diagram of FIG. 3.

DESCRIPTION OF THE PREFERRED EMBODIMENTS

Figure 1:
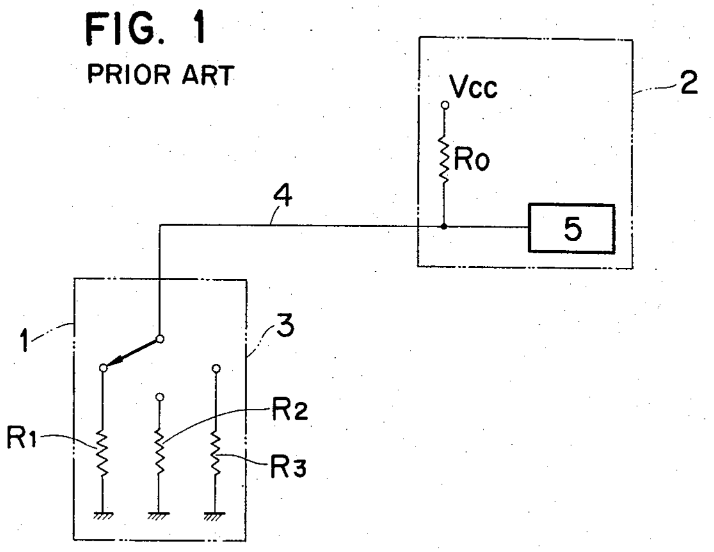
FIG. 1 PRIOR ART
FIGS. 1 and 2 show the diagrams of conventional electrical signal transmitting systems.
Figure 2:
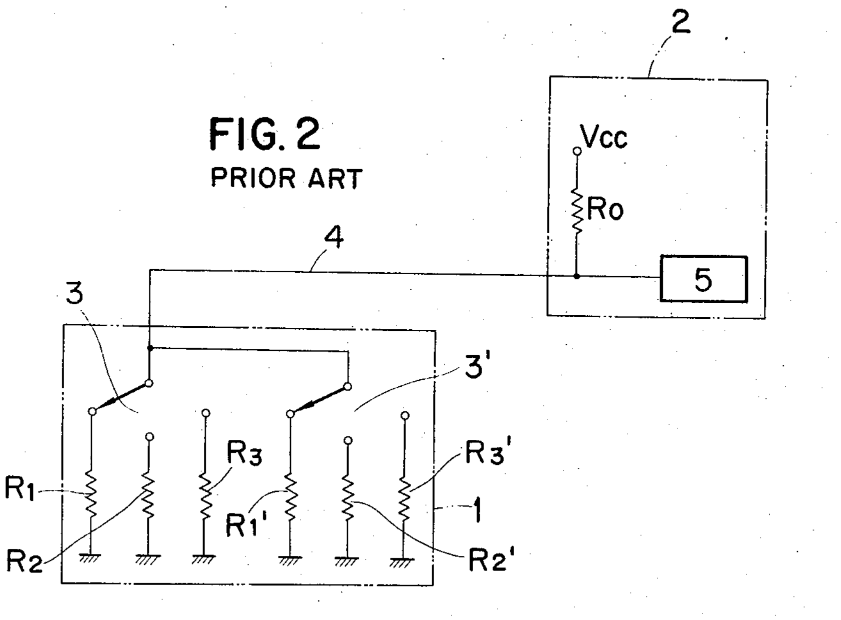
FIG. 2 PRIOR ART

In the drawings, 6 is a transmitter, and 7 is a receiver. The transmitter 6 comprises two change-over switches S, S' having a plurality of contacts, resistors R1, R2, R3 . . . of different values connected between the individual fixed contacts of the change-over switch S and the ground, and condensers C1, C2, C3 . . . of different values connected between the individual fixed contacts of the other change-over switch S' and the ground. The receiver 7 comprises a resistor R0 for performing resistance-division in relation with said resistors R1, R2, R3 . . . a D.C. voltage discriminating circuit A, condensers C1', C2', C3' . . . of different values, a condenser-grounded type oscillating circuits D, D' and D'' including said condensers C1, C1', C2, C2', C3, C3', respectively, and oscillation detecting circuits E, E', E'' which produce outputs when said oscillating circuits D, D', D'' oscillate.

The condensers C1, C2, C3 . . . connected between the ground and the line 8 through the change-over switch S' do not affect the D.C. voltage.

The operation of the above-constructed equipment will now be described.

When the change-over switch S is connected to the resistor R1, there appears a D.C. voltage which is determined by the value of the resistance division formed with the resistor R0. This is in turn identified by the D.C. voltage discriminating circuit A to find which position the switch S has been connected to. In like manner, every time the switch S is changed over, the D.C. voltage changes because of the change in the value of the resistance-division so that the change-over position of the switch can be detected by discriminating the D.C. voltage by the D.C. voltage discriminator A.

When, on the other hand, the change-over switch S′ is connected to the condenser C1, the signal line 8 will be grounded through the condenser C1. If the value of the condensers C1 and C1′ are suitably chosen according to the condition for oscillating the oscillating circuit D, the oscillating circuit D will start and oscillate in relation to said condensers C1 and C1′. The oscillation is detected by the oscillation detecting circuit E thereby enabling the finding of which position the switch S′ is connected. In like manner, every time the switch S′ is changed, the resulting capacity becomes different and one of the oscillating circuits D′, D″ . . . matching the particular capacity starts oscillating. The detecting circuits E′, E″ . . . detect which oscillating circuit has been actuated and thereby indicate the new position of the change-over switch S′.

Figure 4:
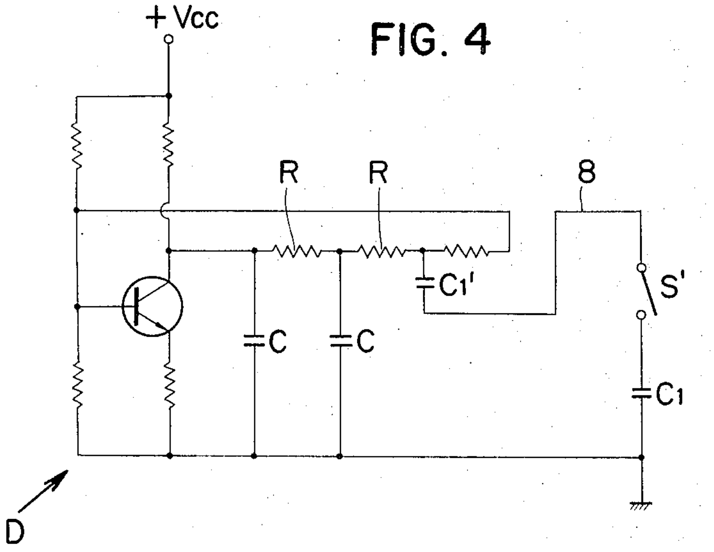

FIG. 4 shows an example of said oscillating circuit D, D′, D″ . . . in which oscillation starts or stops in a parallel capcitor type phase shift oscillating circuit by the operation of the switch S′. Thus, in this circuit wherein three resistors R have an equal value and two condensers C have an equal value, oscillation starts when the series combined capacity of condensers C1′ and C1 is equal to the value of the condenser C.

When the series combined capacity of the condenser C1 on the transmitter 6 side and the condenser C1′ on the receiver 7 side becomes equal to the condenser C, upon changing the change-over switch S′, the oscillating circuit oscillates at the frequency of $\sqrt{6}/2\pi$ RC.

Figure 3:
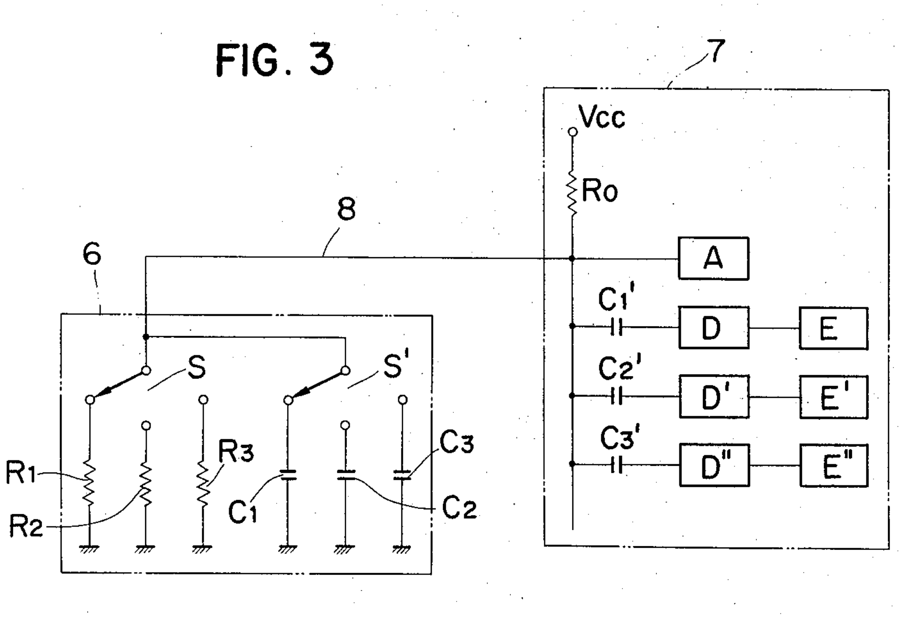
Figure 5:
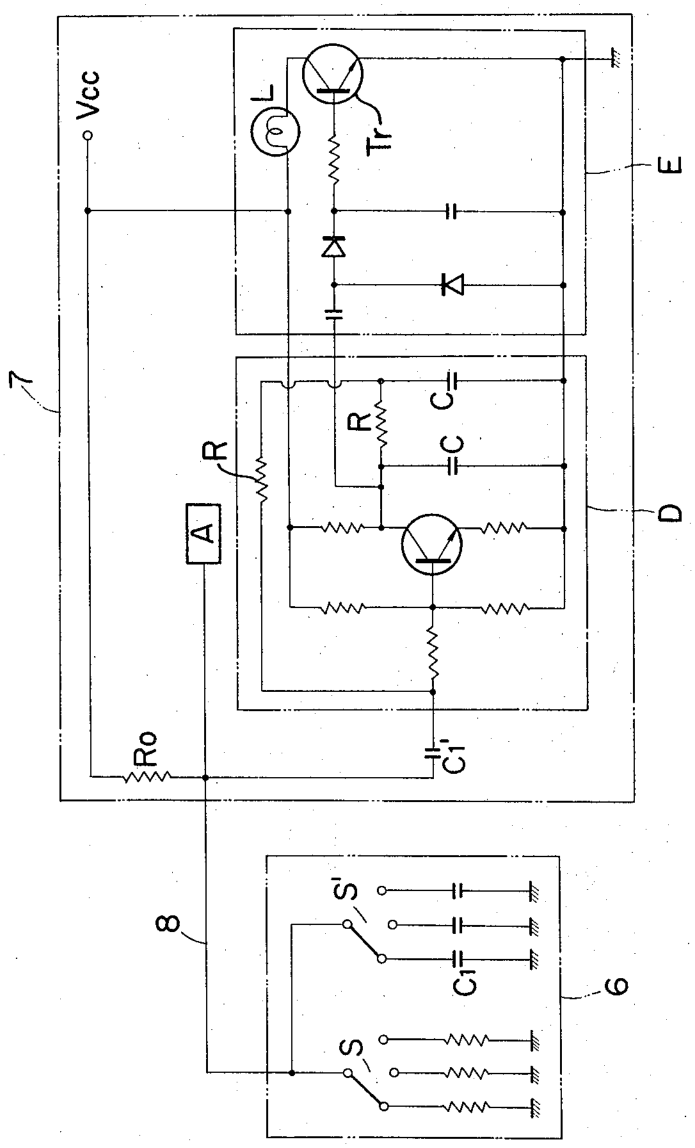

Now an embodiment of the invention using the above-mentioned oscillating circuit will be described with reference to FIG. 5. It should be noted that though in this embodiment only the first stage of the oscillating circuit D and the oscillation detecting circuit E is described for the convenience of description, it is needless to say that as many stages should be connected as the number of the fixed contacts of the change-over switch S′, as shown in FIG. 3. The resistance-division system for detecting the position of the change-over switch S is just the same as in FIG. 3 and therefore its detail will not be described.

The oscillating circuit D starts oscillating when the change-over switch S′ is connected to the condenser C1 and its resulting capacity in combination with condenser C1′ becomes equal to the condenser C. The oscillation of the circuit D turns on the transistor Tr of the oscillation detecting circuit E on so that the lamp L will be on.

If it is preassumed that the movable contact of the change-over switch S′ has contacted the fixed contact to which the condenser C1 is connected when the lamp L is on, it will be possible to detect the change-over position of the said switch S′. In this way, the position of the switch S′ is detectable in oscillating circuits D, D′, D″ and oscillation detecting circuits E, E′, E″ as an A.C. signal, whereas the position of the switch S is detectable in the D.C. voltage signal discriminating circuit A as a D.C. voltage signal.

In this connection it is to be noted that when the values of the condensers C connected in the respective oscillating circuits D, D′, D″ are selected to be different from one another, the values of the condensers $C_1'$, $C_2'$, $C_3'$ need not always be different.

The circuit mentioned above may be applied to a lever switch including a turn signal switch or a dimmer switch in an automobile. Stated illustratively, the resistors may be connected to the turn signal switch and the condensers may be connected to the dimmer switch, so that with a single line from the lever switch it is possible to detect the position of the turn signal switch as a D.C. signal and to detect the position of the dimmer switch as an A.C. signal. Accordingly, if the receiver 7 is arranged near the load, it is possible to control loads in accordance with two switches by means of a single line.

From the foregoing, it is understood that in the present invention both D.C. signals and A.C. signals are carried on a single signal line, the D.C. signals representing the change-over position signal of a change-over switch and the A.C. signals representing the change-over position of another change-over swith. Therefore it is possible to send many signals, namely, positions of many switches on a single line and to identify such signals reliably, without the fear of misoperation and confusion.

What is claimed is:

1. A method for transmitting electrical signals between a transmitter and a receiver through a single signal line, comprising:

coupling a DC voltage discriminating means and plural condenser-grounded type oscillating circuits to the receiver end of said single signal line;

selectively closing and opening differently valued resistive dividing paths between the transmitter end of said signal line and ground to vary the amplitude of a DC voltage signal on said single signal line;

selectively opening and closing differently valued capacitive paths between the transmitter end of said single signal line and ground;

producing from a given said oscillating circuit, upon selective closure of a uniquely corresponding one of said capacitive paths in said transmitter, an AC signal on said single signal line; and detecting in said transmitter, by said AC and DC signals on said single signal line, which of said paths of said transmitter have been selected.

2. An electrical signal transmitting device, comprising:

a single signal line;

a DC voltage source and means connecting same to said single signal line;

a transmitter and receiver having a common ground and being otherwise connected solely through said single signal line;

a plurality of dividing resistors in said transmitter and means for selectively closing and opening paths through said dividing resistors between the transmitter end of said signal line and ground to obtain corresponding DC signals on said single signal line;

a plurality of condenser-grounded type oscillating circuits in said receiver and connected to the receiver end of said single signal line;

a plurality of condensers in said transmitter each cooperative with a respective one of said condenser-grounded type oscillating circuits of said receiver and means selectively closing and opening paths through said condensers between the transmitter end of said signal line and ground for correspondingly starting and stopping oscillation of corresponding oscilating circuits to obtain AC signals on said signal line;

whereby to detect in said receiver, by means of said DC and AC signals on said single signal line, which of said paths in said transmitter have been selected.

3. An electrical signal transmitting device, comprising:

a transmitter having a first change-over switch, plural resistors having different values and connected to said first change-over switch, a second change-over switch, plural condensers having different values and connected to said second change-over switch;

a single signal line having a transmitter end connected to said first and second change-over switches;

a reference resistor and means connecting same between a DC voltage source and said signal line for effecting a resistive voltage division dependent on the one of said plural resistors selected by said first change-over switch;

a receiver having a DC voltage discriminating circuit for discriminating the voltage obtained by said resistive division, plural receiver condensers corresponding respectively to said transmitter condensers and means connecting said plural receiver condensers to the receiver end of said signal line for coupling same to the transmitter condenser selected by said second change-over switch, and a plurality of oscillating circuits each incorporating a corresponding one of said receiver condensers and each responsive to the capacity resulting from coupling of its receiver condenser through said signal line and second change-over switch to the corresponding one of said selectable transmitter condensers for oscillating;

whereby said receiver is capable of detecting the selected position of said switches.

4. An electrical signal transmitting device as claimed in claim 3 wherein said oscillating circuits are of condenser-grounded type.

5. An electrical signal transmitting device as claimed in claim 3, further comprising plural oscillation detecting circuits and means connecting same to corresponding ones of said oscillating circuits for detecting initiation of oscillation of the latter.

6. An electrical signal transmitting device as claimed in claim 3 in which said first and second change-over switches each comprise a movable contact connected to the transmitter end of said signal line and a plurality of fixed contacts alternatively selectable by said movable contact, said fixed contacts of said first and second change-over switches being connected by individual ones of said plural resistors and plural condensers, respectively, to ground, said DC voltage discriminating circuit being connected to the receiver end of said single signal line and having input means thereby connected between said reference resistor and the selected one of said plural resistors and being responsive to the DC voltage level on said signal line for determining the position of said first switch, said receiver condensers being connected in parallel to each other through said single signal line to the movable contact of said second switch.

7. An electrical signal transmitting device as claimed in claim 3 in which said receiver includes means coupling said DC voltage source to said oscillating circuits for supplying operating potential thereto, said reference resistor being connected to said signal line at the receiver end of the latter, each said oscillating circuit including a semi-conductor device powered from said DC source through said coupling means and including further means coupling each receiver condenser to the control electrode of the semi-conductor device of the corresponding oscillating circuit, the receiver condenser and semi-conductor device of each oscillating circuit being thus connected between said single signal line and said DC voltage source in parallel with the corresponding receiver condenser and semi-conductor device of each of the remaining oscillating circuits and in parallel with said reference resistor.

8. An electrical signal transmitting device as claimed in claim 7 in which said oscillating circuits each comprise a parallel capacitor phase shift oscillator, said semi-conductor device comprising a transistor having a collector-emitter path connected between said DC voltage source and ground, said control electrode being the base of said transistor, at least one further condenser coupled across the collector-emitter path of said transistor, a series path incorporating said receiver capacitor, single signal line, second switch and corresponding one of said transmitter capacitors being coupled across said further condenser, the capacity of said further capacitor of a given oscillating circuit being equal to the total capacity of the series connected receiver condenser and a selected transmitter condenser for initiating oscillation of said given oscillating circuit, resistive means connected between the base and collector of said transistor and interconnecting corresponding ends of said further condenser and path.

9. An electrical signal transmitting device as claimed in claim 8 in which at least one of the further condenser and receiver condenser differ in the several oscillating circuits, whereby each oscillating circuit initiates oscillation in response to selection by said second switch of a different valued transmitter capacitor.

10. An electrical signal transmitting device as claimed in claim 5 in which a given said oscillating circuit comprises a semi-conductor device having a control electrode and main electrodes, an RC network having a resistive leg connecting one said main electrode to said control electrode, and parallel condenser legs paralleling said main electrodes, in which one said condenser leg comprises a further capacitor and another said condenser leg comprises said receiver capacitor and a corresponding one of said transmitter capacitors, the corresponding one of said oscillation detecting circuits comprising a further semi-conductor device having main electrodes and indicating means coupled in series therewith to said DC source, said further semiconductor device also having a control electrode coupled to said one main electrode of said oscillating circuit semi-conductor device and responsive to oscillation of said oscillating circuit for actuating said indicating means.

* * * * *